United States Patent [19]

Hamasaki

[11] Patent Number: 5,420,631
[45] Date of Patent: May 30, 1995

[54] SOLID STATE IMAGE PICKUP DEVICE AND METHOD

[75] Inventor: Masaharu Hamasaki, Kanagawa, Japan

[73] Assignee: Sony Corporation, Tokyo, Japan

[21] Appl. No.: 53,189

[22] Filed: Apr. 28, 1993

[30] Foreign Application Priority Data

May 6, 1992 [JP] Japan ................... 4-140957

[51] Int. Cl.[6] .......... H04N 3/15; H04N 5/335
[52] U.S. Cl. ................. 348/229; 348/302; 348/304; 348/296; 348/241
[58] Field of Search ............. 358/213.19, 213.16, 358/213.26, 213.23, 213.15, 213.11; 348/302, 303, 304, 316, 241, 243, 245, 294, 295, 296, 252, 308, 229, 230, 297, 310; H04N 5/335; 257/291, 292

[56] References Cited

U.S. PATENT DOCUMENTS

| | | | |
|---|---|---|---|
| 4,518,863 | 5/1985 | Fukuoka et al. | 358/213.23 |
| 4,589,024 | 5/1986 | Koch et al. | 348/302 |
| 4,609,825 | 9/1986 | Berger et al. | 250/578 |
| 4,870,493 | 9/1989 | Izawa et al. | 358/213.19 |
| 5,027,217 | 6/1991 | Oshio et al. | 358/213.19 |

FOREIGN PATENT DOCUMENTS

| | | | |
|---|---|---|---|
| 0075696 | 4/1983 | European Pat. Off. | H04N 3/15 |
| 0117375 | 9/1984 | European Pat. Off. | H04N 3/15 |
| 2538652 | 6/1984 | France | H04N 3/15 |
| 1263080 | 2/1972 | United Kingdom | H04N 3/15 |

OTHER PUBLICATIONS

IEEE Journal of Solid-State Circuits, vol. SC-15, No. 3, Jun. 1980, New York (US) pp. 373-375 Robert J. Kansy 'response of a correlated double sampling circuit to 1/f noise' p. 373, left column, line 7-Line 37; figure 1.

Primary Examiner—Michael T. Razavi
Assistant Examiner—Andrew B. Christensen
Attorney, Agent, or Firm—William S. Frommer; Alvin Sinderbrand

[57] ABSTRACT

A solid state imaging device includes an image sensor having a two-dimensional matrix of picture elements. A first vertical scanning circuit provides a first vertical scanning signal, while a second vertical scanning circuit provides second and third vertical scanning signals. A switching circuit is coupled with horizonal lines of picture elements in the image sensor on one vertical side of the two-dimensional matrix and serves to switch either the first vertical scanning signal from the first vertical scanning circuit to the horizontal lines of picture elements, or in the alternative, the second and third vertical scanning signals from the second vertical scanning circuit thereto. When selected by the switching circuit, the first vertical scanning signal reads the picture elements in a respective horizontal line and a horizontal scanning circuit scans the picture elements in the selected horizontal line to read image signals from these picture elements. The second vertical scanning signal, when selected by the switching circuit, serves to reset the picture elements of the line which has been read, while the third vertical scanning signal serves to reset the picture elements in a different selected horizontal line.

14 Claims, 3 Drawing Sheets

SOLID STATE IMAGE PICKUP DEVICE AND METHOD

BACKGROUND OF THE INVENTION

The present invention relates to solid state image pick-up devices provided with an electronic shutter function, such as MOS-type and JFET-type solid state image pickup devices in which the picture elements in each accumulate charge representing an image signal.

Solid state image pickup devices, such as MOS-type and JFET-type image pickup devices, include an image sensor portion in which a plurality of picture elements are arranged in a two-dimensional matrix so that the picture elements are arranged both horizontally and vertically. Vertically aligned picture elements share a common vertical signal line. In operation, horizontal lines of picture elements are separately selected so that the charge accumulated in each element of the selected horizontal line is read via its corresponding vertical signal line. Typically, the read process is carried out by correlation double sampling (CDS) in which the charge accumulated in each picture element is first read, then the element is reset, and finally an "empty signal" is read from the element to be subtracted from the image signal read prior to the reset (termed a "read reset" herein). The empty signal is a black reference, and by subtracting the empty signal from the previously read image signal, the effect of a dark current level in the respective picture element is eliminated.

Conventional solid state imaging devices employ a first vertical scanning circuit coupled with the various horizontal lines of the image sensor portion on a first vertical side thereof through a plurality of respective drivers and switching transistors. The first vertical scanning circuit selects the horizontal lines in succession for reading. A second vertical scanning circuit is coupled with the horizontal lines at a second vertical side of the image sensor portion through a different respective plurality of drivers and switching transistors. The second vertical scanning circuit serves both to select the horizontal line which has also been selected by the first circuit for reading in order to reset the picture elements of that line between the reading of the image signal and the empty signal of each. The second vertical scanning circuit also applies a second reset signal to a second horizontal line spaced from the horizontal line being read by a predetermined number of lines. This second reset is termed an "electronic shutter" since after each of the elements has been reset by the second reset signal, it accumulates a charge proportional to an amount of light received thereby until such time that the line thus reset is again selected for reading.

In the conventional solid state image pickup device as described above, the impedance encountered during the read and reset of each horizontal line includes the on-resistance of both drivers as well as the on-resistance of both switching transistors on both sides of the line being read or reset. The relatively high level of impedance thus encountered limits the speed of operation of the image pickup device disadvantageously.

OBJECTS AND SUMMARY OF THE INVENTION

It is an object of the present invention to overcome the shortcomings and disadvantages of conventional solid state image pickup devices.

It is another object of the present invention to reduce the number of drivers and associated circuitry necessary for scanning a solid state imaging device.

It is a further object of the present invention to increase the number of picture elements which may be fabricated on a single substrate of a solid state imaging device, thus to improve the image resolution that may be achieved.

It is still another object of the present invention to reduce the impedance encountered in scanning a solid state imaging device, thus to improve its speed of operation.

In accordance with a first aspect of the present invention, a solid state imaging device comprises an image sensor including a two-dimensional matrix of picture elements arranged horizontally and vertically therein to form a plurality of vertically spaced horizontal lines thereof, the two-dimensional matrix of picture elements having first and second opposed vertical sides; the image sensor further including a plurality of vertical lines each coupling vertically disposed ones of the picture elements; a first vertical scanning means for coupling with the first vertical side of the two-dimensional matrix of picture elements for supplying a read scanning signal to the horizontal lines of picture elements for selecting the horizontal lines thereof in a predetermined order at a predetermined switching speed for reading image signals from the picture elements of the selected horizontal lines accumulated therein; a horizontal scanning means for selecting individual ones of the picture elements in each horizontal line selected by the first vertical scanning means for reading the image signals accumulated therein through the plurality of vertical lines; and a second vertical scanning means for coupling with the first vertical side of the two-dimensional matrix of picture elements for supplying first scanning signals to the horizontal lines of picture elements at the first vertical side of the two-dimensional matrix of picture elements for resetting the picture elements of the horizontal lines selected for reading by the first vertical scanning means, and for resetting the picture elements of selected ones of the horizontal lines spaced from the ones thereof selected by the first vertical scanning means in a predetermined order and at a switching speed substantially the same as the predetermined switching speed of the first vertical scanning means. Since the first and second vertical scanning means are coupled with the same vertical side of the two-dimensional matrix of picture elements, it is possible to dispense with the need for drivers and switches on both sides of the matrix, thus reducing the impedance encountered in reading and resetting the picture elements. Moreover, the numbers of drivers and associated circuitry are thereby reduced.

In accordance with another aspect of the present invention, a solid state imaging device comprises an image sensor including a two-dimensional matrix of picture elements arranged horizontally and vertically therein to form a plurality of vertically spaced horizontal lines thereof, the two-dimensional matrix of picture elements having first and second opposed vertical sides; the image sensor further including a plurality of vertical lines each coupling vertically disposed ones of the picture elements; a first vertical scanning circuit operative to provide a first vertical scanning signal at an output thereof; a second vertical scanning circuit operative to provide second and third vertical scanning signals at respective outputs thereof; a switching circuit coupled with the horizontal lines of picture elements at the first vertical side of the two-dimensional matrix and with the outputs of the first and second vertical scanning circuits, the switching circuit being operative to supply the first vertical scanning signal to the horizontal lines at the first vertical side during predetermined read periods to select first ones of the horizontal lines during respective ones of the predetermined read periods for reading the picture elements therein; and a horizontal scanning circuit operative to provide a horizontal scanning signal at a plurality of outputs thereof each coupled with a respective one of the vertical lines to successively select picture elements in each of the selected first ones of the horizontal lines to read an image signal produced thereby; the switching circuit being further operative to supply the second vertical scanning signal to the selected first ones of the horizontal lines at the first vertical side of the two-dimensional matrix during a reset period to reset the picture elements therein, and to supply the third vertical scanning signal at the first vertical side to second selected ones of the horizontal lines spaced from the selected first ones of the horizontal lines to reset the picture elements in the second selected ones of the horizontal lines. Since the first, second and third vertical scanning signals are supplied by the switching circuit to the same vertical side of the matrix, it is once again possible to avoid the need for drivers and associated circuitry on both sides of the matrix, thus to increase the space available for picture elements. In addition, the impedance encountered in reading and resetting the horizontal lines is advantageously reduced.

In accordance with a further aspect of the present invention, a method of reading and resetting a solid state imaging device including an image sensor having a two-dimensional matrix of picture elements arranged horizontally and vertically therein to form a plurality of vertically spaced horizontal lines thereof, the two-dimensional matrix of picture elements having first and second opposed vertical sides, the image sensor further including a plurality of vertical lines each coupling vertically disposed ones of the picture elements, comprises the steps of: supplying a read scanning signal to the horizontal lines of picture elements through the first vertical side of the two-dimensional matrix of picture elements for selecting the horizontal lines thereof in a predetermined order at a predetermined switching speed for reading image signals from the picture elements of the selected horizontal lines accumulated therein; selecting individual ones of the picture elements in each horizontal line selected for reading the image signals accumulated therein through the plurality of vertical lines; supplying first reset scanning signals to the horizontal lines of picture elements selected for reading through the first vertical side of the two-dimensional matrix of picture elements for resetting the picture elements thereof; and supplying second reset scanning signals through the first vertical side to the picture elements of selected ones of the horizontal lines spaced from the ones thereof selected for reading, in a predetermined order and at a switching speed substantially the same as the predetermined switching speed at which the horizontal lines are selected for reading. Since the scanning signals are applied through a common side of the matrix of picture elements, it is possible to reduce the impedance then encountered as compared with prior art methods. It is likewise possible to implement the method of the present invention with the use of fewer drivers and associated circuitry, thus to permit an increase in the number of picture elements employed in the image sensor portion.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

As used herein, expressions such as "downwardly", "upwardly" "upper" "lower" "above" "below" "horizontal" and "vertical" when referring to elements of the devices and methods disclosed and/or claimed herein are used in this application to express relative positions and directions, rather than positions and directions with respect to a fixed reference. It is intended that these terms should be broadly construed. Their use herein is for convenience and to promote a clear understanding of the present invention.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF AN ADVANTAGEOUS EMBODIMENT

Figure 1:
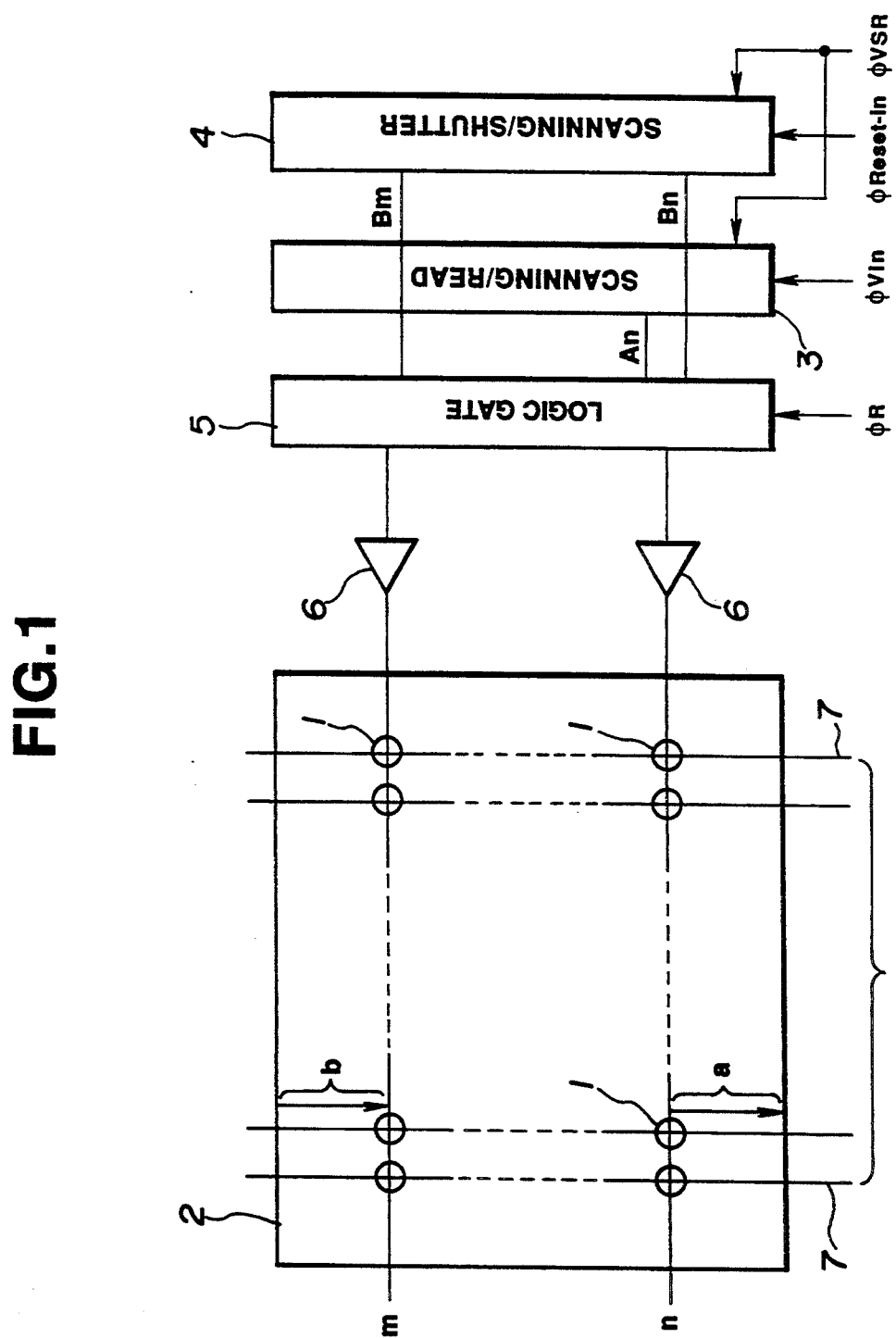
FIG. 1 provides a diagrammatic view of an image sensor portion of a solid state imaging device together with associated vertical scanning circuitry in block diagram format, in accordance with an embodiment of the present invention.

Referring now to the drawings and presently to Fig. thereof, the image sensor portion 2 of a solid state imaging device in accordance with an advantageous embodiment of the present invention includes a plurality of picture elements (pixels) 1 which individually combine the functions of a photosensor and an MOS or JFET transistor. Picture elements are illustrated symbolically in FIG. 1 as a plurality of vertically and horizontally distributed circles for simplicity and clarity. More particularly, the pixels 1 are disposed in vertical columns or lines and horizontal rows or lines such that the picture elements 1 of each column are coupled by a common respective vertical signal line 7, and the picture elements 1 of each horizontal line or row of the matrix are arranged in a plurality of horizontal lines illustrated by representative ones thereof m and n.

A first vertical scanning circuit 3 produces a read scanning signal which serves to select each of the horizontal lines of picture elements during a corresponding horizontal line period of a video signal in a predetermined order for reading the picture elements 1 of each selected line. A second vertical scanning circuit 4 produces a pair of reset scanning signals for use in resetting the picture elements of selected pairs of horizontal lines pursuant to correlation double sampling as well as to carry out an electronic shutter function. More particularly, the first of the pair of reset scanning signals produced by the second vertical scanning circuit 4 serves to reset the picture elements in a selected horizontal line spaced by a predetermined number of lines from a horizontal line selected for reading during the same horizontal line period by the circuit 3. During the same line period and after the selected line is thus read, it is reset by the second of the pair of reset scanning signals from circuit 4, and then read again to read an empty signal from each picture element thereof, thus to carry out reading of the picture elements by correlation double sampling.

The picture elements 1 of the FIG. 1 embodiment produce respective image signals by accumulating a charge representing an amount of light received thereby. When reset, each of the picture elements 1 loses its accumulated charge. The second vertical scanning circuit 4 acts as an electronic shutter by resetting the picture elements of each line in succession by means of the first of the pair of reset scanning signals a predetermined number of lines (and thus a predetermined time period) before the picture elements thereof are read. During the predetermined time period, the picture elements each accumulate a charge proportional to the amount of light received thereby after reset by the first reset scanning signal and up to the time they are read.

The first and second vertical scanning circuits 3 and 4 comprise respective shift registers. The shift register included in the first vertical scanning circuit 3 is supplied with a start pulse $\phi V_{in}$, while the shift register included in the second vertical scanning circuit 4 is supplied with start pulses $\phi$Reset-in, thus to initiate the scanning signals when the respective start pulses are clocked into the shift registers. Each of the shift registers is supplied with the same shift clock pulse VSR for shifting the scanning signals therethrough. Accordingly, the signals are shifted at the same rate through the two shift registers.

The shift register of the vertical scanning circuit 3 includes a plurality of outputs $A_1, A_2, \ldots, A_n, \ldots$, each corresponding with one of the successively arranged stages of the shift register and a like-numbered one of the horizontal lines. A single shift pulse is clocked through the shift register of circuit 3, such that only one of the outputs (designated $A_n$ in FIG. 1) is at a "1" state at any given time, the remainder being at a "0" state. Only output $A_n$ is illustrated in FIG. 1 for simplicity and clarity.

The shift register of circuit 4 includes a plurality of outputs $B_1, B_2, \ldots, B_m, \ldots, B_n, \ldots$, each corresponding with one of the successively arranged stages of the shift register and a like-numbered one of the horizontal lines. Two separate shift pulses are clocked through the shift register of circuit 4, a first shift pulse constituting the first of the pair of reset scanning signals and the second constituting the second of the pair. Consequently, first and second ones of the outputs $B_m$ and $B_n$ of the shift register are at a 1 state at any given time, the remainder being at a 0 state. Only outputs $B_m$ and $B_n$ of circuit 4 are illustrated in FIG. 1 for simplicity and clarity.

Each of the outputs $A_1 A_2, \ldots, A_n, \ldots,$, of the first vertical scanning circuit 3 is connected with a respective one of a first set of inputs of a logic gate 5, while each of the outputs $B_1, B_2, \ldots, B_n, \ldots, B_m, \ldots,$ is connected with a respective one of a second set of inputs of the logic gate 5. The logic gate 5 has a plurality of outputs each of which corresponds with a respective one of the horizontal lines of the two-dimensional matrix of picture elements and is coupled therewith through a driver 6. The logic gate 5 is operative to couple either the respective outputs of the first scanning circuit 3 or the respective outputs of the second scanning circuit 4 with the like-numbered ones of the horizontal lines of the image portion 2. The logic gate 5 has a control input at which it receives a switching signal $\phi R$ and is responsive to a low level of the signal R to apply the outputs $A_1, A_2, \ldots, A_n$, to the respective horizontal lines through the drivers 6, and to a high level of the switching signal R to couple the outputs $B_1, B_2, \ldots, B_m, \ldots, B_n, \ldots$, to the horizontal lines through the respective drivers 6. Since the first and second reset scanning signals supplied at the outputs $B_m$ and $B_n$ are applied to their respective lines simultaneously, the reset operation carried out during correlation double sampling effected by the scanning signal supplied at the output $B_n$ occurs at the same time as the electronic shutter reset effected by the scanning signal supplied at the output $B_m$.

Figure 2:
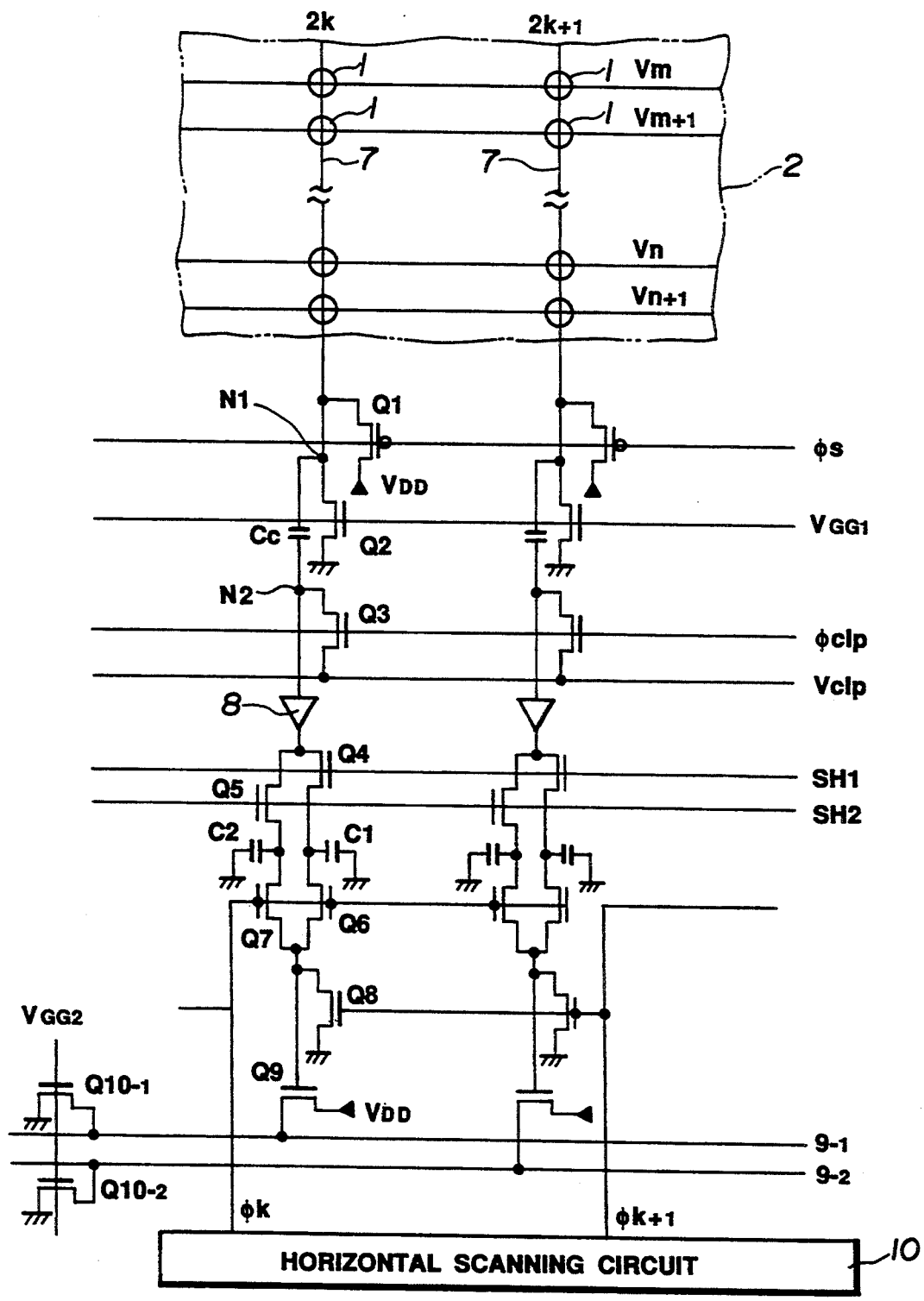
FIG. 2 is a partially schematic and partially block diagram illustrating circuitry employed in the embodiment of Fig. 1 to read image signals accumulated in the picture elements of the image sensor portion thereof.

Referring now to FIG. 2, image signal read circuitry of the FIG. 1 embodiment for reading the image signals accumulated in picture elements 1 by correlation double sampling, is illustrated therein. Each of the vertical signal lines 7 is connected through a lower horizontal side of the image portion 2 to a node N1 of a respective one of a plurality of read circuits, a representative one of which is described hereinafter.

The node N1 of the representative read circuit is connected to a first terminal of the source-drain circuit of an n-channel transistor Q1, the second terminal of the source-drain circuit of transistor Q1 being coupled with a power source voltage $V_{DD}$. Node N1 is also connected with a first terminal of the source-drain circuit of a p-channel transistor Q2, the second terminal of its source-drain circuit being coupled to ground. Transistor Q1 serves as a gate for the output of the respective vertical signal line 7 under the control of a signal $\phi S$ supplied to its gate. Transistor Q2 serves as a load for the respective signal line 7 and receives an appropriate biasing voltage $V_{GG1}$ at its gate.

A noise removal capacitor $C_c$ has a first terminal connected to node N1 and a second terminal connected to a node N2 and serves to accumulate a signal output from the respective signal line 7 under the control of gate transistor Q1. The first terminal of the source-drain circuit of an MOS transistor Q3 is connected to node N2, the second terminal of the source-drain circuit being coupled to receive a clamp voltage $V_{clp}$. The gate of transistor Q3 is provided with a clamp pulse clp which turns on transistor Q3 to clamp the node N2 to $V_{clp}$ such that noise, such as reset noise, is suppressed in the image signal read through correlation double sampling.

Node N2 is also connected with the input of a buffer 8 which serves to couple the image signal selectively to the first terminal of one of a pair of capacitors C1 and C2 through the source-drain circuit of a respective one of a pair of MOS switching transistors Q4 and Q5. The second terminal of each of capacitors C1 and C2 is coupled with ground. Each of the capacitors C1 and C2 together with its respective switching transistor Q4 and Q5 forms a sample and hold circuit for an image signal read from the corresponding picture element of a selected horizontal line. Control of each of switching transistors Q4 and Q5 is exercised by a respective one of a pair of sample and hold signals SH1 and SH2 supplied to the gate thereof. During successive horizontal periods, an alternate one of the transistors Q4 and Q5 is turned on during the horizontal blanking interval by a respective signal SH1 and SH2, so that capacitor C1 serves to accumulate and hold image signals of even numbered ones of the horizontal lines while capacitor C2 serves to accumulate and hold image signals of odd numbered ones of the horizontal lines.

The first terminal of capacitor C2 is coupled with a first terminal of the source-drain circuit of an MOS transistor Q7, while the first terminal of capacitor C1 is connected with the first terminal the source-drain circuit of further MOS transistor Q6. The second terminal of the source-drain circuit of each of transistors Q6 and Q7 is connected in common to the gate of a further MOS transistor Q9. A first terminal of the source-drain circuit of transistor Q9 is coupled with voltage source $V_{DD}$ while the second terminal thereof is coupled with one of a pair of horizontal signal lines $9_{-1}$ and $9_{-2}$. Each of the horizontal signal lines $9_{-1}$ and $9_{-2}$ is coupled with alternate ones of the plurality of read circuits through the source-drain circuits of respective transistors Q9, and is also coupled with a first terminal of the source-drain circuit of a respective MOS load transistor $Q10_{-1}$ and $Q10_{-2}$. The second terminal of the source-drain circuit of each of transistors $Q10_{-1}$ and $Q10_{-2}$ is coupled to ground, while the gate terminals thereof are both coupled with a source of a biasing voltage $V_{GG2}$. Each of the plurality of read circuits also includes an MOS reset transistor Q8 having a first terminal of its source-drain circuit connected with the gate of transistor Q9 and a second terminal thereof coupled to ground.

Figure 3:
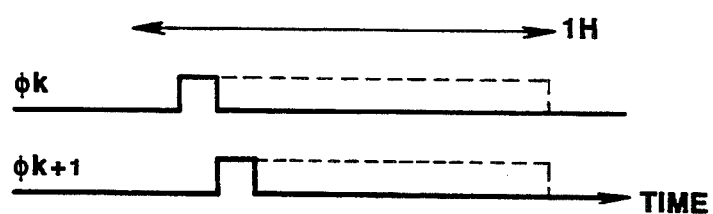
FIG. 3 is a time chart illustrating horizontal scanning signals produced for reading the picture elements of a respective horizontal line of the image sensor portion in succession.

A horizontal scanning circuit 10 has a plurality of outputs each of which is coupled with the gates of the transistors Q6 and Q7 of each of a first pair of adjacent ones of the plurality of read circuits, as well as to the gates of transistors Q8 of each of an adjacent, second pair of the plurality of read circuits situated to the left of the first pair as depicted in FIG. 2. For purposes of simplicity and clarity only two successive ones of the outputs $\phi K$ $\phi$and $\phi K+1$ of the horizontal scanning circuit 10 are illustrated in FIG. 2. With reference also to FIG. 3, the horizontal scanning circuit 10 applies a scanning pulse successively to its outputs proceeding from left to right as depicted in FIG. 2 during each horizontal scanning period. Accordingly, as illustrated in FIG. 3, the scanning pulse will be applied to the output $\phi K$ of the circuit 10 at a predetermined time during each horizontal scanning period, so that the transistors Q6 and Q7 of a respective pair of the plurality of read circuits coupled with the output $\phi K$ will then be turned on in order to output the image signal accumulated either on capacitor C1 or capacitor C2 of each of the pair of read circuits for that line. The image signal thus read out is applied to the gate of transistor Q9 acting as a source follower to apply the image signal in turn to a respective one of the horizontal lines $9_{-1}$ and $9_{-2}$. At the same time, the transistors Q8 of the immediately preceding pair of read circuits is turned on by the pulse applied to output $\phi K$ thus to switch off the transistors Q9 of the preceding pair of read circuits. Thereafter, output $\phi K$ is brought low while output $\phi K+1$ goes high as the scanning pulse is applied thereto. Consequently, the next succeeding pair of read circuits is caused to output the stored image signals to the horizontal signal lines $9_{-1}$ and $9_{-2}$, while the transistors Q8 of the pair of read circuits from which the image signals were read by the pulse previously applied to the output $\phi K$ are turned on by the subsequent pulse on the output $\phi K+1$ thus to turn off the transistors Q9 thereof.

Figure 4:
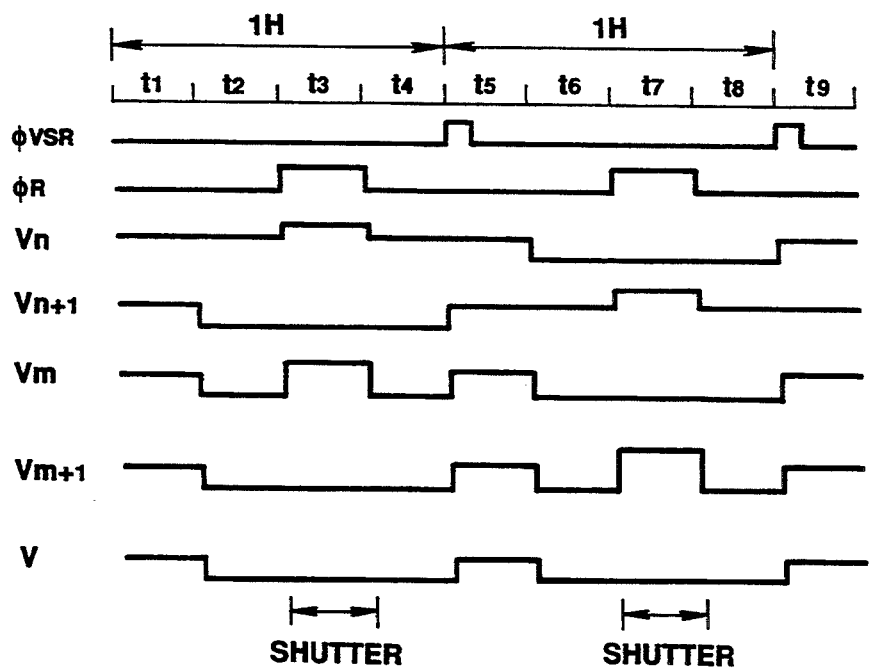
FIG. 4 is a time chart for use in explaining the operation of the vertical scanning functions carried out in both reading and resetting the picture elements of the image sensor portion of the embodiment of FIG. 1.

With reference now to FIG. 4, both the correlation double sampling read function and the electronic shutter function carried out by the embodiment of FIGS. 1 and 2 are explained in connection therewith. Essentially, the solid state image pickup device of FIGS. 1 and 3 reads the $n^{th}$ horizontal line by means of the read scanning signal and a first one of the reset scanning signals produced by the first and second vertical scanning circuits 3 and 4, respectively, during an $n^{th}$ horizontal scanning period, and during the same horizontal scanning period resets the $m^{th}$ horizontal line by means of the second reset scanning signal produced by the second vertical scanning circuit 4 to carry out the electronic shutter function. During the next subsequent horizontal line period, the $n+1^{th}$ horizontal line is read in the same manner as the $n^{th}$ line, while the $m+1^{th}$ horizontal line is reset pursuant to the electronic shutter function in the same manner as the $m^{th}$ horizontal line was reset during the preceding horizontal line period.

More specifically, and with reference to FIG. 4, a first horizontal line period is spanned by time segments t1 through t4. The horizontal blanking period of the first horizontal line period occurs during the time segment t1 at which time the read and reset scanning signals are shifted by the circuits 4 and 5for reading the $n^{th}$ horizontal line and resetting the $m^{th}$ horizontal line. It will be seen that during the subsequent time segment t2, the reset pulse $\phi R$ is at a low level, so that the outputs of the first vertical scanning circuit 3 are applied by the logic gate 5 to the drivers 6, and the read scanning signal $A_n$ is applied through a respective driver 6 to the $n^{th}$ horizontal line during the time segment t2. Consequently, the image signals in all of the picture elements 1 in the $n^{th}$ horizontal line are each read to the respective vertical signal line 7 to be stored in the appropriate one of the capacitors C1 and C2 of the respective read circuit.

During the following time segment t3, the inputs to the buffers 8 are clamped by virtue of the clamp pulse $\phi_{clp}$ and the reset pulse $\phi R$ is brought to a high level so that the outputs of the second vertical scanning circuit 4 are selected by the logic gate to be coupled to the drivers 6. Consequently, at that time the first and second reset scanning signals $B_m$ and $B_n$ are supplied through the drivers 6 to the $m^{th}$ and $n^{th}$ horizontal lines, respectively, to reset the picture elements therein. It should be noted that the same voltage level is selected for the first and second reset scanning signals $B_m$ and $B_n$ which is selected at a level higher than the level of the read scanning signal $A_n$ in order to effect a reset of the picture elements in the selected horizontal lines. The second reset scanning signal $B_n$ applied to the $n^{th}$ horizontal line resets all of the picture elements 1 therein in order to permit the picture elements in the $n^{th}$ horizontal line to be read subsequently during time segment t4 in order to read empty signals thereof representing dark current levels of the respective elements, pursuant to the correlation double sampling read technique. The reset of the picture elements 1 in the $m^{th}$ horizontal line during the segment t3 carries out the electronic shutter function so that the picture elements of this line will subsequently accumulate charge in proportion to the amount of light received thereby between reset and subsequent reading thereof. It will be seen, therefore, that the electronic shutter reset of the $m^{th}$ horizontal line occurs simultaneously with the read reset of the $n^{th}$ horizontal line.

As noted above, during the segment $t_4$, the empty signals of the picture elements in the $n^{th}$ line are read. Accordingly, the pulse $\phi R$ is returned to a low level for the segment $t_4$ to again couple the outputs of the first vertical scanning circuit 3 through the drivers 6 to the horizontal lines, so that the level of the read scanning signal $A_n$ is then applied to the $n^{th}$ horizontal line in order to read the empty signals in the picture elements thereof which have been reset as described above.

As seen in FIG. 4, at the beginning of the next horizontal line period, the shift clock $\phi$VSR is brought high to shift the read and reset scanning signals within the first and second vertical canning circuits 3 and 4, so that the read scanning pulse is shifted from line $A_n$ to line $A_{n+1}$ and the first and second reset scanning signals are shifted to lines $B_{m+1}$ and $B_{n+1}$, respectively. During time segments $t_6$ through $t_8$, the picture elements in the $n+1^{th}$ horizontal line are read by correlation double sampling, while the picture elements in the $m+1^{th}$ horizontal line are reset pursuant to the electronic shutter function, in the same manner as described above in connection with the $n^{th}$ and $m^{th}$ horizontal lines.

It will be seen from the foregoing that the electronic shutter period is a function of the number of horizontal lines between the $n^{th}$ and $m^{th}$ horizontal lines. In the illustration of FIG. 1, for example, the number of horizontal lines intervening between the $m^{th}$ line which is reset and the $n^{th}$ line which is read is equal to (a+b), so that the fewer the number of horizontal lines which thus intervene, the shorter will be the shutter period. The number (a+b) may be selected as any number which provides a sufficiently long shutter period, provided that the lines n and m do not coincide.

It will be seen from the foregoing that, since the first and second vertical scanning circuits 3 and 4 are coupled to the same side of the two-dimensional matrix of picture elements, only one set of drivers 6 is required, thus to reduce the impedance encountered in reading and resetting the lines of picture elements. Accordingly, an improved speed of operation may be achieved. By reducing the circuitry required for reading and resetting the image sensor portion of the device, it is thus possible to provide additional space for the image sensor portion where the circuits of FIG. 1 are fabricated on a signal substrate, thus to increase the number of picture elements which may be fabricated thereon, and consequently improve the resolution of the image signal which can be produced.

Since the second vertical scanning circuit 4 outputs both of the first and second reset scanning signals, the reset function carried out pursuant to the correlation double sampling read technique and the electronic shutter reset can be carried out at the same time.

Although a specific embodiment of the invention has been described in detail herein with reference to the accompanying drawings, it is to be understood that the invention is not limited to the disclosed embodiment, and that various changes and modifications may be effected therein by one skilled in the art without departing from the scope or spirit of the invention as defined in the appended claims.

What is claimed is:

1. A solid state imaging device, comprising:
   an image sensor including a two-dimensional matrix of picture elements arranged horizontally and vertically therein to form a plurality of vertically spaced horizontal lines thereof, the two-dimensional matrix of picture elements having first and second opposed vertical sides;
   the image sensor further including a plurality of vertical lines each coupling vertically disposed ones of the picture elements;
   coupling means for supplying signals to the first vertical side of the two-dimensional matrix of picture elements;
   a first vertical scanning means for supplying a read scanning signal to the first vertical side of the two-dimensional matrix of picture elements via the coupling means to apply the read scanning signal to the horizontal lines of picture elements to select the horizontal lines thereof in a predetermined order at a predetermined switching speed;
   a horizontal scanning means for selecting individual ones of the picture elements in each horizontal line selected by the first vertical scanning means for reading the image signals accumulated therein through the plurality of vertical lines;
   a second vertical scanning means for supplying first scanning signals to the first vertical side of the two-dimensional matrix of picture elements via the coupling means to apply the first scanning signals to the horizontal lines of picture elements at the first vertical side of the two-dimensional matrix of picture elements, the first scanning signals serving to reset the picture elements of the horizontal lines selected for reading by the first vertical scanning means and serving to reset the picture elements of selected ones of the horizontal lines spaced from the ones thereof selected by the first vertical scanning means in a predetermined order and at a switching speed substantially the same as the predetermined switching speed of the first vertical scanning means.

2. A solid state imaging device according to claim 1, wherein the image sensor, the first and second vertical scanning means and the horizontal scanning means are fabricated on a common substrate.

3. A solid state imaging device according to claim 1, wherein the first and second vertical scanning means are operative to select the horizontal lines for reading and resetting, respectively, in accordance with a correlation double sampling technique.

4. A solid state imaging device according to claim 1, wherein the second vertical scanning means is operative to reset the picture elements of the selected ones of the horizontal lines spaced from the ones thereof selected by the first vertical scanning means such that the second vertical scanning means permits each of the picture elements to accumulate a respective image signal for a predetermined period prior to reading thereof to carry out an electronic shutter operation.

5. A solid state imaging device according to claim 1, wherein the coupling means comprises switching means for selectively coupling one of the first and second vertical scanning means with the horizontal lines of picture elements for selectively reading and resetting the picture elements thereof.

6. A solid state imaging device according to claim 5, wherein the switching means comprises a logic gate.

7. A solid state imaging device according to claim 1, wherein the second vertical scanning means is operative to simultaneously select pairs of horizontal lines for resetting the picture elements thereof, the horizontal lines of each selected pair being spaced apart by a predetermined number of lines selected to establish a predetermined electronic shutter period for the picture elements of the image sensor.

8. A solid state imaging device, comprising:

an image sensor including a two-dimensional matrix of picture elements arranged horizontally and vertically therein to form a plurality of vertically spaced horizontal lines thereof, the two-dimensional matrix of picture elements having first and second opposed vertical sides;

the image sensor further including a plurality of vertical lines each coupling vertically disposed ones of the picture elements;

a first vertical scanning circuit operative to provide a first vertical scanning signal at an output thereof;

a second vertical scanning circuit operative to provide second and third vertical scanning signals at respective outputs thereof;

a switching circuit coupled with the horizontal lines of picture elements at the first vertical side of the two-dimensional matrix and with the outputs of the first and second vertical scanning circuits, the switching circuit being operative to supply the first vertical scanning signal to the horizontal lines at the first vertical side during predetermined read periods to select first ones of the horizontal lines during respective ones of the predetermined read periods for reading the picture elements therein; and a horizontal scanning circuit operative to provide a horizontal scanning signal at a plurality of outputs thereof each coupled with a respective one of the vertical lines to successively select picture elements in each of the selected first ones of the horizontal lines to read an image signal produced thereby;

the switching circuit being further operative to supply the second vertical scanning signal to the selected first ones of the horizontal lines at the first vertical side of the two-dimensional matrix during a reset period to reset the picture elements therein, and to supply the third vertical scanning signal at the first vertical side to second selected ones of the horizontal lines spaced from the selected first ones of the horizontal lines to reset the picture elements in the second selected ones of the horizontal lines.

9. A solid state imaging device according to claim 8, wherein the switching circuit comprises a logic gate.

10. A solid state imaging device according to claim 9, further comprising a plurality of storage devices for storing the image signals read through respective ones of the plurality of vertical lines.

11. A solid state imaging device according to claim 10, wherein each of the plurality of storage devices comprises a capacitor for storing a charge representing the image signal read from a corresponding picture element.

12. A solid state imaging device according to claim 8, wherein the switching circuit is operative to supply the first and second vertical scanning signals to the selected first ones of the horizontal lines to read and reset the picture elements therein in accordance with a correlation double sampling technique.

13. A solid state imaging device according to claim 8, wherein the switching circuit is operative to supply the second and third vertical scanning signals simultaneously to selected pairs of horizontal lines, the lines of each pair being spaced apart by a predetermined number of lines selected to establish a predetermined electronic shutter period for the picture elements of the image sensor.

14. A method of reading and resetting a solid state imaging device including an image sensor having a two-dimensional matrix of picture elements arranged horizontally and vertically therein to form a plurality of vertically spaced horizontal lines thereof, the two-dimensional matrix of picture elements having first and second opposed vertical sides, the image sensor further including a plurality of vertical lines each coupling vertically disposed ones of the picture elements, comprising the steps of:

supplying a read scanning signal to the horizontal lines of picture elements through the first vertical side of the two-dimensional matrix of picture elements for selecting the horizontal lines thereof in a predetermined order at a predetermined switching speed;

selecting individual ones of the picture elements in each horizontal line selected for reading the image signals accumulated therein through the plurality of vertical lines;

supplying first reset scanning signals to the horizontal lines of picture elements selected for reading through the first vertical side of the two-dimensional matrix of picture elements for resetting the picture elements thereof; and supplying second reset scanning signals through the first vertical side to the picture elements of selected ones of the horizontal lines spaced from the ones thereof selected for reading, in a predetermined order and at a switching speed substantially the same as the predetermined switching speed at which the horizontal lines are selected for reading.

* * * * *